Patented Mar. 27, 1951

2,546,179

UNITED STATES PATENT OFFICE 2,546,179

PROCESS OF HANDLING SUGAR

Howard S. Paine, Dobbs Ferry, N. Y., and Mary F. Hughes, Jersey City, N. J., assignors to Refined Syrups & Sugars, Inc., Yonkers, N. Y., a corporation of New York No Drawing. Application September 2, 1948, Serial No. 47,543

19 Claims. (Cl. 99—150)

This invention relates to the handling and particularly the transportation and/or storage of unrefined sugar.

The juice extracted from sugar cane is commonly processed to produce the ordinary raw sugar of commerce and then transported and/or stored in solid form before being refined. In fact, a very large proportion of the cane sugar refined in the United States is imported as raw sugar by the refineries. The handling of solid raw sugar has had serious disadvantages for a great many years. The raw sugar usually has been bagged for transportation, which involves considerable labor in loading and unloading the bagged sugar incident to transporting it. At the same time, the handling of the raw sugar in bags, which have to be filled and subsequently emptied, necessarily is unsanitary and may introduce objectionable foreign matter into the sugar which subsequently has to be removed during refining. In order to avoid the objectionable handling of sugar in bags, some refineries have even resorted at considerable expense, to bulk storing and handling of solid raw sugar.

It is an object of our invention to overcome these difficulties by providing a practical process of handling unrefined sugar in the form of a high density syrup or solution. This makes it possible to ship the unrefined sugar in tankers or tank cars, and to store the sugar in tanks, which can readily be loaded and unloaded economically by pumping, and has the further advantage of making it possible to handle the sugar in a more sanitary manner.

Another object of our invention is the provision of a method of transporting or storing unrefined sugar in the form of a high density solution or syrup which is protected from substantial contamination by molds and yeasts.

Another object of our invention is the provision of such a method of handling a high density unrefined sugar syrup by the addition thereto of a preservative, protection of the surface thereof from free access to air, and, when necessary, control of the pH of the syrup.

Other objects and advantages will be explained and will be apparent from the following description of our invention.

We have found that unrefined sucrose can be satisfactorily transported or stored for relatively long periods if it is made up into either a high density raw sugar melt or a high density washed raw sugar melt, or the equivalent, and properly protected from excessive inversion of the sucrose and contamination by molds and yeasts. By high density we mean a syrup or solution having a concentration of the order of 60–68° Brix. In order to protect such a solution or syrup adequately, it is desirable to add a suitable preservative to the melt and protect the surface of the melt from free access to air by floats or other mechanical means, or by a protective layer of a suitable fluid. If the invert sugar content of the solution is to be maintained at a low value, it is also desirable to make sure that the pH of the melt does not drop too low. Various combinations of these measures are usually desirable, even though the melt when prepared may be heated to a very high temperature such as 190° F., which is sufficient to kill most, if not all, of the microorganisms that may be present initially in the raw sugar. In spite of the preparation at such a high temperature, however, a melt of unrefined sugar kept under ordinary conditions soon becomes contaminated not only by molds which secrete the enzyme invertase causing inversion of the sucrose, but also by certain hardy strains of yeast which are capable of growing even in sugar syrups of comparatively high densities. Such yeasts may be referred to generically as osmophiles.

In the course of their development, these osmophiles generally multiply in greatest numbers first at the surface of a sugar syrup because of the greater availability of oxygen.

We have found that protection of the surface of such a syrup from free access to air and oxygen is very effective in restricting the growth of yeasts and molds therein. However, surface protection alone is not adequate to enable unrefined sucrose to be made up into a syrup and transported or stored for a considerable period of time without excessive deterioration. This is particularly so if the melt is a raw sugar melt because such a liquor contains more nutrient substances for yeasts and molds than a melt of washed raw sugar.

We have found that under most conditions it is essential also to include a preservative in the sugar melt. The combination of these measures, however, does make it possible to handle a melt of unrefined sugar even though fairly high temperatures are encountered, as in the tropics and during the summer, and even though the melt in handling is pumped from place to place during storage or shipping which necessarily involves a certain amount of aeration. The action of most preservatives is such that they are effective to kill micro-organisms in the syrup for only a limited time, usually due to a gradual break down or conversion of the preservative into another compound or compounds. Thus, if a syrup to which a preservative is added also has its surface protected from free access to the air, it is protected against recontamination with yeasts and molds, and consequently can be stored for much longer periods of time after only one treatment with a minimum amount of the preservative.

As will be understood by those skilled in the art, the unrefined sugar that is stored and/or transported should contain as low a content of invert sugar as possible, if it is to be used for making crystallized sugar or a sucrose syrup. Not only is the low invert sugar content needed in order to obtain a finished product low in such sugar, but also the presence of such invert sugar helps to encourage and promote the growth of the objectionable yeasts. For this reason we prefer to store or transport the unrefined sugar in the form of a washed raw sugar melt from which most of the invert sugar has been eliminated by washing. On the other hand, if the unrefined sugar is to be used for making a finished syrup containing a substantial quantity of invert sugar, the amount of such invert sugar initially present in the unrefined sugar syrup to be stored or transported is much less important.

The surface of the sugar solution or syrup can be protected against free access to the air in various ways. For example, this may be accomplished by the proper design of the storage or shipping tanks, the use of a solid or hollow float which remains constantly in contact with the surface of the liquid, or filling a specially designed tank in such a manner that no more than a very small surface of the liquid is exposed to the air. Alternatively, a gas incapable of supplying oxygen to the yeast, such as carbon dioxide, may be introduced into the tank to form a protective screen or blanket over the surface of the liquid. The most practical procedure, however, is to add to the syrup a liquid that has a lower specific gravity than the sugar syrup so that it floats on top of it, that is not a source of oxygen, that does not readily mix or react with the syrup, and that forms a protective blanket over the surface of the syrup. Various vegetable and mineral oils can be used for this purpose, and as a practical matter ordinary fuel oil is satisfactory. A floating layer of oil or similar immiscible liquid has the further advantage that it can be pumped along with the sugar syrup from one tank to another and always rises to the surface in the new tank or receptacle to reform its protective blanket.

In the handling or pumping of a syrup carrying an oil layer on its surface, pipes may be used which dip below the level of the oil layer to avoid exposing the syrup to the air any more than necessary. Such an oil layer thus can be used not only to restrict the surface growth of molds and yeasts, but also to prevent such micro-organisms in the air from getting into the syrup.

Protection of the surface of the sugar melt from access to air by itself may be adequate under the best possible conditions if the storage or shipping time is very short. As a practical matter, however, it is desirable also to introduce a bacteriostatic or a bactericidal reagent into the sugar melt. Such a reagent or preservative should be selected that has an effective action on the yeasts and molds when added in very small amounts, does not react chemically with the sugar present, is not toxic, or if toxic, is or can be converted subsequently to a harmless compound or compounds, or can be removed readily during subsequent refining of the sugar. Examples of preservatives that we have found suitable under most conditions include sodium chlorite, chlorine dioxide, formaldehyde, copper naphthenate, and various quatenary ammonium compounds, such as diisobutyl phenoxyethoxyethyl di-methylbenzyl ammonium chloride, n(acyl colamino formyl-methyl) pyridinium chloride, 9-octadicenyl dimethylethyl ammonium bromide, alkyl dimethylbenzyl ammonium chloride, and cetyltrimethyl ammonium bromide.

The amount of the preservative added obviously will depend largely upon the particular compound or mixture of compounds selected for this purpose. In addition, the amount added will vary, depending upon the nature and quantity of non-sugar compounds and invert sugar in the melt to which it is added and the degree to which it is already infected with molds and yeasts. For example, a plain melt of raw sugar or a sugar melt containing a substantial amount of invert sugars will require addition of a larger proportion of the preservative than will be needed for handling a syrup of 99 to 99.5% purity.

We have further found that if the invert sugar content of the unrefined syrup is to be held to a low value it is most desirable to maintain or control the pH of the melt during the transportation or storage within the range of about 6 to 7.5. If the pH of the melt drops substantially below 6 for any period of time, a condition is created which greatly favors yeast growth and activity and inversion of sucrose. Such yeast growth can be repressed entirely even without using a bactericide if the pH is maintained at 8.0 or above, but it is not desirable to maintain such a high pH for any length of time because it results in the formation of color bodies which are difficult to remove and increases the cost of the refining process. Also, at very high pH levels there is apt to be some destruction of the sugar.

We have found that one practical method of controlling the pH within the preferred limits is to add a buffer to the melt, or to add a base such as lime or a relatively insoluble carbonate, such as calcium carbonate, which is easily suspended in the sugar melt, and maintains the pH safely above the point where excessive inversion of sucrose occurs.

A particularly suitable means of controlling the pH of the syrup during storage is to add to the syrup a quantity of light finely divided precipitated calcium carbonate. Suitable means such as stirrers or pumps should be used periodically, or continuously if necessary, to maintain this material in suspension. Of course, the finer and lighter the suspended material, the easier it will be to maintain a reasonably uniform suspension.

Of course, if it is known that the unrefined syrup to be stored and/or transported is to be used to make a finished syrup containing a substantial proportion of invert sugar, the control of pH of the unrefined syrup and other measures to repress inversion may be omitted, and the syrup can be handled with only the addition of the preservative and surface protection.

The following examples are given to illustrate our invention but it is to be understood that the invention is not limited to the particular conditions, amounts or compounds given therein.

*Example I.*—A washed raw sugar melt was prepared having a Brix of 67.5°, and pH of 6.45 and analyzing 0.29% invert sugar, 98.96% sucrose and 99.25% total sugars. This syrup, which contained initially 123 yeasts per ml. was covered with a protective layer of fuel oil and had 0.05% of formaldehyde added to it and a small amount of calcium carbonate suspended in it.

After two months of storage at a temperature of 85–90° F. with periodic transfer from one container to another, it was found that the syrup had a Brix of 67.6°, a pH of 6.25, an invert sugar content of 0.32% and exhibited no viable yeasts or molds.

*Example II.*—A washed raw sugar melt was prepared having a concentration of 67.8° Brix, a pH of 6.4 and an invert sugar content of 0.13%. This melt was inoculated with about 100 yeasts/ml. and treated with 100 P. P. M. of sodium chlorite ($NaClO_2$). Finely divided calcium carbonate was suspended in the melt, its surface was covered with a layer of fuel oil and it was stored at 90° F. with a periodic circulation to maintain the calcium carbonate in suspension.

At the end of 15½ weeks of storage under these conditions, the melt still had a concentration of 67.8° Brix and a pH of 6.3. The invert sugar content had increased slightly to 0.20% but no viable yeasts were found in the syrup.

*Example III.*—To a washed raw sugar melt of 68.1° Brix having a pH of 6.7 and an invert sugar content of 0.17% was added 125 yeasts/ml., 100 P. P. M. of chlorine dioxide, and finely divided calcium carbonate in suspension. This melt was covered with an oil layer and stored at 90° F. for two months.

At the end of this time the syrup had a concentration of 68.0° Brix, a pH of 6.35, an invert sugar content of 0.25% and no viable yeasts were found.

*Example IV.*—Another washed raw sugar melt having a concentration of 68.4° Brix, a pH of 6.1 and an invert sugar content of 0.08% was inoculated with 100 yeasts/ml. To this was added 50 P. P. M. of a quaternary ammonium compound sold under the trade name of "Hyamine 1622" and consisting of di-isobutylphenoxyethoxyethyl dimethylbenzyl ammonium chloride, fuel oil to form a surface layer and finely divided calcium carbonate to form a suspension.

After storage for one month at a temperature of about 100° F. the syrup had a concentration of 68.2° Brix, a pH of 6.5, 0.4% of invert sugar and no live yeasts.

*Example V.*—A raw sugar melt was prepared having a Brix of 68.28°, a pH of 5.9, an invert sugar content of 0.93%, a sucrose content of 96.56% and a yeast count of 104 per ml. To this melt was added 1000 P. P. M. of copper naphthenate and a suspension of calcium carbonate. The surface was covered with a layer of fuel oil.

After four months, this melt had a Brix of 67.64°, a pH of 5.9, an invert sugar content of 0.81% and a count of 17 yeasts per ml.

A similar raw sugar melt used as a control which was protected by fuel oil on its surface, but which has no preservative or calcium carbonate added to it showed an increase in yeast count to 663,000 per ml. in less than one month, and at the end of three months an increase in invert sugar content to 26.19% with a drop in concentration to 65° Brix and in pH to 4.58.

It will be apparent from the foregoing that the satisfactory storage and transportation of unrefined sugar in liquid form for use in producing a refined sugar of low invert sugar content requires control or suppression not only of the growth of yeasts and molds, but also of the increase in invert sugar, and that the two problems are closely interrelated. Yeast and mold growth should be suppressed to keep down inversion of sucrose. Invert sugar content should be held to a low value not alone for the production of a refined or finished sugar or sugar syrup of low invert sugar content, but also because it supports growth of the objectionable yeasts.

Some of the preservatives given as examples decompose in time to form acidic products which have the effect of reducing the pH of the sugar melt. Sodium chlorite, which in other respects is an excellent preservative, is one such material since it decomposes over a period of time into acidic oxychlor compounds. When such a preservative is employed, it is practically essential to use some separate means such as suspended calcium carbonate to keep the pH of the melt from dropping too low during the storage period if substantial inversion of sucrose is to be avoided. The amount of calcium carbonate added will vary with different conditions such as the composition and initial pH of the syrup to be stored, the amount and composition of the preservative that has to be added to it, and the temperature and time of storage. For example, about 4 grams of calcium carbonate per gallon of syrup is desirable with most raw sugar melts while only 1 gram/gallon is usually sufficient in a washed raw sugar melt.

Because of its possible effect on the pH of the melt as well as for other obvious reasons, it is usually desirable to add to the melt to be stored or transported as small an amount of the preservative as possible, taking the other factors into consideration.

The time of storage, temperature of the stored melt and its pH all have their influence on the inversion of sucrose in the melt. If the melt is to be stored for a long period such as several months and the invert sugar content is to be held to a low value, the temperature as well as the pH can be an important factor. In fact if a melt prepared under certain conditions is maintained at a temperature of 100° F. or less during such a period, it can make the difference between success and failure compared with a similar melt stored at 110° F. On the other hand such differences in temperature are far less important during short storage or transportation periods.

Our procedure has important economic advantages over the handling of unrefined sugar in solid form since the ease of storing and handling the liquid syrup more than compensates for the cost of materials added to the syrup to prepare it for storage or transportation.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

We claim:

1. A process of handling unrefined sucrose which comprises forming a high density aqueous solution thereof having a pH of about 6 to about 7.5, adding a small proportion of a preservative thereto to inhibit growth of yeasts and molds in said solution, and transporting or storing the solution in this form while protecting its surface from free contact with the air, said preservative comprising a substance that does not react appreciably with the sucrose.

2. A process of handling unrefined sucrose which comprises forming a high density aqueous solution, adding a small proportion of a preservative thereto to inhibit growth of yeasts and molds in said solution, and transporting or storing the solution in this form with the surface of the solution protected from free contact with the air.

3. A process of shipping or storing unrefined sugar which comprises handling said sugar in the form of a high density aqueous solution containing a small proportion of a bactericidal reagent and having its surface protected against free access of the air by a layer of a liquid that floats on said solution and is relatively immiscible therewith.

4. A process of shipping or storing unrefined sugar which comprises handling said sugar in the form of a high density aqueous solution containing a substance to maintain the pH of the solution above about 6 and having its surface protected against free access of the air by a layer of a liquid that remains as a liquid, floats on said solution and is relatively immiscible therewith.

5. A process of shipping or storing unrefined sugar which comprises handling said sugar in the form of a high density aqueous solution containing a bactericide and a substance to maintain the pH of the solution above about 6 and having its surface protected against free access of the air by a layer of a liquid that floats on said solution and is relatively immiscible therewith.

6. A process of shipping or storing unrefined sugar which comprises handling said sugar in the form of a high density aqueous solution containing a small proportion of sodium chlorite and a finely divided relatively insoluble carbonate in suspension, and having its surface protected against free access of the air by a layer of a liquid that floats on said solution and is relatively immiscible therewith.

7. A process of shipping or storing unrefined sugar which comprises handling said sugar in the form of a high density aqueous solution containing a small proportion of copper naphthenate and having its surface protected against free access of the air by a layer of a liquid that floats on said solution and is relatively immiscible therewith.

8. A process of shipping or storing unrefined sugar which comprises handling said sugar in the form of a high density aqueous solution containing a small proportion of a quaternary ammonium compound as a preservative agent and having its surface protected against free access of the air by a layer of a liquid that floats on said solution and is relatively immiscible therewith.

9. A process of handling unrefined sugar for storage and transportation which comprises preparing said sugar in the form of a washed raw sugar melt, protecting its surface from free access of air by adding thereto a layer of oil covering said surface, controlling the pH of the melt between the limits of about 6 and about 7.5, and adding thereto a small amount of a preservative to suppress growth of yeasts and molds.

10. A process of storing or transporting unrefined sugar which comprises handling the sugar in tanks in the form of a washed raw sugar melt having its surface covered with a layer of oil, containing sufficient sodium chlorite to suppress yeast growth, and containing finely divided calcium carbonate maintained in suspension therein.

11. A process of storing or transporting unrefined sugar which comprises handling the sugar in tanks in the form of a washed raw sugar melt having its surface covered with a layer of oil, containing sufficient sodium chlorite to suppress yeast growth, containing a finely divided relatively insoluble acid neutralizing substance in suspension therein, and maintained at a temperature of not more than about 100° F.

12. A process of preparing unrefined sugar for storage or transportation which comprises forming the sugar into a washed raw sugar melt, adding thereto as a preservative a sufficient quantity of sodium chlorite to suppress yeast growth, adding thereto finely divided relatively insoluble acid neutralizing material to form a suspension thereto, and covering the surface of the melt with a layer of oil.

13. A high density aqueous solution of unrefined sucrose which is suitable for transportation and storage and protected against growth of yeasts and molds therein by a small proportion of a bactericidal agent added to the solution, and a covering layer of material that prevents free access of air to the surface of the solution.

14. A high density aqueous solution of unrefined sucrose which is suitable for transportation and storage and protected against growth of yeasts and molds therein by a small proportion of sodium chlorite added to the solution, and a covering layer of oil on the surface of the solution.

15. A high density aqueous solution of unrefined sucrose which is suitable for transportation and storage and protected against growth of yeasts and molds therein by a small proportion of a bactericidal agent added to the solution, a covering layer of liquid floating on the solution to prevent free access of air to the surface thereof, and a finely divided acid neutralizing substance suspended in the solution to control the pH thereof.

16. A process of shipping or storing unrefined sugar which comprises handling said sugar in the form of a high density aqueous solution containing a small proportion of a bactericidal reagent and having its surface protected against free access of the air by a layer of oil floating on the surface of said solution.

17. A high density aqueous solution of unrefined sucrose which is suitable for transportation and storage and protected against growth of yeasts and molds therein by a small proportion of a bactericidal agent added to the solution, and a covering layer of oil floating on its surface.

18. A process of shipping or storing unrefined sugar which comprises handling said sugar in the form of a high density aqueous solution containing a substance to maintain the pH of the solution above about 6 and having its surface protected against free access of the air by a layer of a mineral oil that is liquid at normal temperatures.

19. A process of handling unrefined sugar in bulk during storage or transportation which comprises preparing said sugar in the form of a washed raw sugar melt, controlling the pH of the melt to maintain it above about 6, and protecting the surface of the melt against free access of air by covering it with a floating layer of a normally liquid oil.

HOWARD S. PAINE.
MARY F. HUGHES.

(References on following page)

REFERENCES CITED

The following references are of record in the file of this patent:

UNITED STATES PATENTS

| Number | Name | Date |
|---|---|---|
| 106,465 | Cassel | Aug. 16, 1870 |
| 253,712 | Isaacson | Feb. 14, 1882 |
| 694,301 | De Sturler | Aug. 15, 1900 |
| 1,852,941 | Stewart | Apr. 5, 1932 |
| 2,269,203 | Hopkinson | Jan. 6, 1942 |
| 2,295,655 | Hentrich et al. | Sept. 15, 1942 |

FOREIGN PATENTS

| Number | Country | Date |
|---|---|---|
| 369,391 | Great Britain | Mar. 24, 1932 |

OTHER REFERENCES

"The American Woman's Cook Book," edited by Ruth Berolzheimer, Consolidated Book Publishers, Chicago, 1945, page 682.